United States Patent [19]

McKee

[11] Patent Number: 5,103,454

[45] Date of Patent: Apr. 7, 1992

[54] LIGHT BEAM ATTENUATION

[75] Inventor: Terrence J. McKee, Nepean, Canada

[73] Assignee: Lumonics Inc., Kanata, Canada

[21] Appl. No.: 665,667

[22] Filed: Mar. 7, 1991

[51] Int. Cl.⁵ .............................................. H01S 3/13
[52] U.S. Cl. ..................................... 372/29; 372/107;
372/108; 372/99
[58] Field of Search ................... 372/99, 108, 103, 107,
372/29; 350/166

[56] References Cited

U.S. PATENT DOCUMENTS

| | | | |
|---|---|---|---|
| 4,009,453 | 2/1977 | Mahlein | 372/99 |
| 4,072,858 | 2/1978 | Stone | 372/99 |
| 4,084,883 | 4/1978 | Eastman et al. | 372/99 |
| 4,573,156 | 2/1986 | Anthony et al. | 372/99 |
| 4,611,270 | 9/1986 | Klauminzer et al. | |
| 4,723,841 | 2/1988 | Roy et al. | |
| 4,747,673 | 5/1988 | Mars et al. | |
| 4,778,263 | 10/1988 | Foltyn | 350/166 |
| 4,809,293 | 2/1989 | DeBell | 372/99 |
| 4,856,019 | 8/1989 | Miyata et al. | 372/99 |
| 4,899,348 | 2/1990 | Kiya et al. | |
| 4,912,717 | 3/1990 | Takeuchi | |
| 4,932,754 | 6/1990 | Haisma et al. | 372/103 |

OTHER PUBLICATIONS

McKee et al., "A High-Power Long Pulse Excimer Laser", IEEE Photonics Technology Letters, vol. 1, No. 3, Mar. 1989.

Primary Examiner—Léon Scott, Jr.

[57] ABSTRACT

Variable attenuation of a light beam is achieved by mounting a rotatable multilayer dielectric attenuator in the beam. A first portion of the beam is transmitted through the attenuator and a second portion is reflected. Rotation of the attenuator about an axis transverse to the beam varies the ratio between these portions. The main application of this attenuator is to control an output characteristic, e.g. output power, of a laser, and may include a feedback loop to maintain this characteristic constant.

23 Claims, 2 Drawing Sheets

LIGHT BEAM ATTENUATION

FIELD OF THE INVENTION

This invention relates to improvements in light beam attenuation. While one of the main applications of the invention is to the control of the output characteristics of a laser, it is also applicable to non-coherent light beams.

BACKGROUND OF THE INVENTION

One conventional method of varying the output power of a laser is to vary its input voltage or current. This voltage or current can be controlled by a feedback circuit connected to a detector that monitors the output power. In this way the output power can be kept constant, as the efficiency of the laser deteriorates with time. See, for example, U.S. Pat. No. 4,611,270 issued Sept. 9, 1986 to G. K. Klauminzer et al. This general method has the disadvantage, however, that variation of the input voltage has a tendency to change other parameters of the laser output, that it is not desired to change, such as pulse length, pulse shape, beam size, and beam homogeneity. Also, in the case of many pulsed lasers including excimer lasers there may be more than one storage means and hence more than one voltage that would require to be varied. See, for example T. J. McKee et al, "A High-Power Long Pulse Excimer Laser", IEEE Photonic Technology Letters Vol. 1, No. 3, pp. 59–61 (1989).

There are also some lasers, including excimer lasers, in which variation of the input voltage affords only a very narrow range of output power values.

In addition to these situations in which it is desired to maintain the output power constant, i.e. to restore it to an original value as the laser's efficiency deteriorates with time, there are also occasions in which it is desired to reduce the output power to a lower level for a particular use.

For these and other reasons, the art has developed various devices for the attenuation of a light beam. One such device is an absorber that is located in the beam. This approach is satisfactory for low power beams, but presents overheating problems when the power of the beam is high. In this latter situation it is better to use a partial reflector for reflecting some of the light. If desired, the reflectivity of the reflector can be varied by various means.

One such proposal for varying the reflectivity has been suggested by D. A. B. Miller et al in "Variable attenuator for Gaussian lasers beams", published in Applied Optics, Vol. 17, No. 23, Dec. 1, 1978, pp 3804–3808. This proposal employs multilayer dielectric mirrors to form an interference filter that is varied in thickness across the width of a substrate, i.e. is slightly wedge shaped. This device forms an attenuator that varies its transmittance as it is moved transversely across a laser beam. The difficulty with this system is that the transmittance is different across the transverse dimension of the beam. This was not a problem in the Miller et al proposal, because the beam had been given a very small diameter by being passed through a 200 μm diameter pinhole to act as a spatial filter, but is unsatisfactory for wider beams.

In the absence of a spatial filter, a typical laser beam width is much greater than 200 μm. A typical beam of a CW gas laser is round in cross-section with a diameter anywhere from about 0.1 mm to 10 mm. For pulsed solid state lasers, the beams are also usually round with diameters between 5 mm and 20 mm. For pulsed gas lasers, the beams are usually square or rectangular. For example the beam of a $CO_2$ laser could be from 5×5 mm to 50×50 mm. The beams of excimers lasers are typically 5×20 mm, but they can be square, e.g. 30×30 mm. One excimer laser has a round beam of diameter 1 mm or so.

It is also known to use multilayer dielectric coatings as static attenuators in very high power lasers. The user selects an attenuator from a set of graded multilayer dielectric coated substrates all designed for a specific wavelength and having respective reflectivities of 10%, 20%, 50%, 90% and 99%, for example. These attenuators will be so designed that their reflectivity is relatively insensitive to the angle of incidence of the beam, at least between 0° and about 20°. Once selected and installed, the attenuator will be mounted in a fixed position, usually at a slight angle to the beam, e.g. 5°, to avoid reflection back into the optical cavity of the laser.

SUMMARY OF THE INVENTION

The object of the present invention is to provide a variable attenuation system for a light beam, e.g. a laser beam, that utilizes the reflectivity characteristics of a multilayer dielectric coating, while at the same time achieving uniform attenuation across the width of the beam, without any need to restrict this width as in the Miller et al proposal.

To this end, the invention consists of apparatus for varying the attenuation of a light beam, such apparatus comprising a multilayer dielectric attenuator, a surface of which receives the beam so that a first portion of the beam is transmitted through the attenuator and a second portion is reflected by the attenuator, the apparatus being characterized by the fact that the attenuator is rotatable about an axis that is substantially transverse to the beam to enable the ratio between these portions to be varied.

When such an attenuator is used in association with a laser, the attenuator can be manually or automatically rotated to achieve one of a wide range of output characteristics, without the attendant disadvantages discussed above, especially those associated with a need to vary the laser's input voltage.

If the output characteristic, for example power, is monitored, a feedback circuit can be used to maintain this power constant, e.g. by gradually reducing the attenuation as the laser efficiency declines. Alternatively, the system can be used to cause the output power to follow a selected, non-uniform, predetermined program.

DETAILED DESCRIPTION OF THE PREFERRED EMBODIMENTS

Figure 1A:
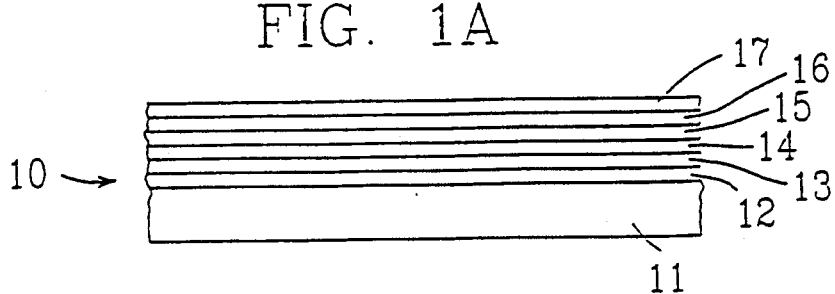
FIG. 1A is a diagram of a multilayer dielectric attenuator for use in the invention.

FIG. 1A shows an attenuator 10 suitable for use in the present invention, and consisting of a quartz substrate 11 on there are six dielectric layers 12-17, layers 12, 14 and being of scandium oxide, alternated with layers 13, 15 and of silicon dioxide, this system being designed for use with a 308 nm laser beam. The thicknesses of these layers are:

| layer | physical thickness | optical thickness |
| --- | --- | --- |
| 12 | 20.9 nm | 0.13 |
| 13 | 65.2 nm | 0.31 |
| 14 | 80.3 nm | 0.50 |
| 15 | 105.1 nm | 0.50 |
| 16 | 80.3 nm | 0.50 |
| 17 | 105.1 nm | 0.50 |

Figure 1B:
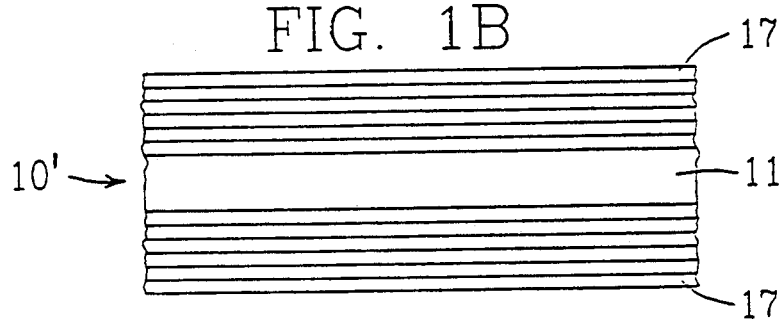
FIG. 1B shows a modification to the attenuator of FIG. 1A.

FIG. 1B shows an attenuator 10' with the same layers disposed on both sides of the substrate.

Figure 2:
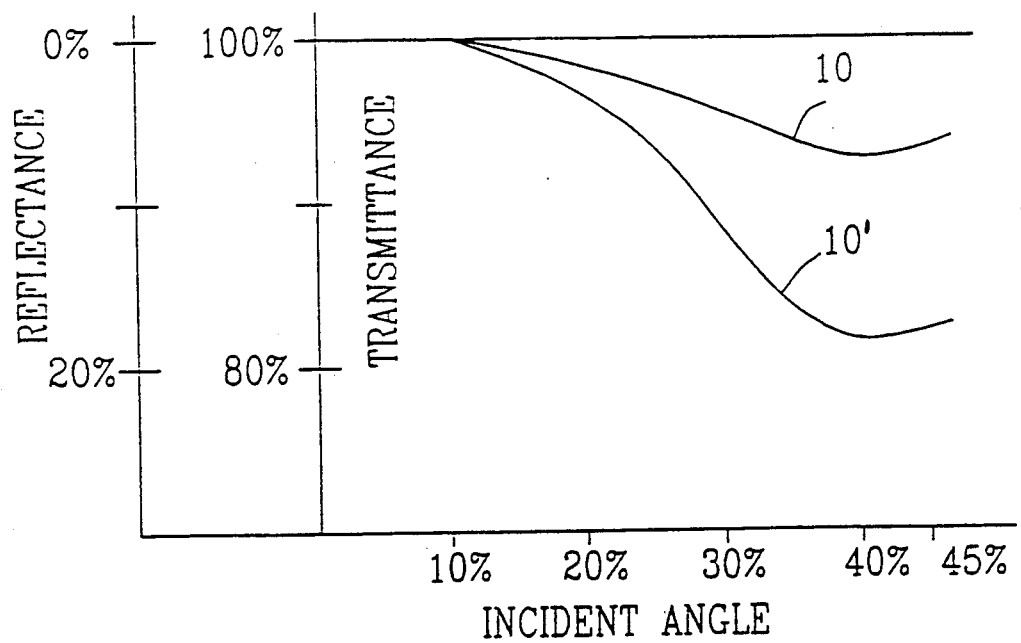
FIG. 2 is a graph of the typical transmittance characteristics of a multilayer dielectric attenuator for this purpose.

FIG. 2 shows the calculated transmittance of the attenuators 10 and 10' as a function of the angle of incidence of the beam. Since there is negligible absorption, the reflectance is 100% minus the transmittance. These properties of such dielectric layer are known in the art. See, for example, "Optical Systems Design, Analysis, and Production" by P. J. Rogers et al, published in Proceedings of SPIE—The International Society for Optical Engineering, Vol. 399, pp 246-258, and "Excimer Lasers, Their Applications, and New Frontiers, in Lasers" by R. W. Waynant, published in Proceedings of SPIE—The International Society for Optical Engineering, Vol 476 pp 128-135, which articles describe the design and manufacture of dielectric thin films for various interference applications.

A further alternative is that the attenuator be coated on both sides, but not in the same way. In other words, the layers on the second side could be different in number and/or in materials, from the layers on the first side.

For example, for a low gain laser where the overall reflectivity should be quite low, it may be useful to place a broad angle antireflecting coating on the second surface to reduce the Fresnel reflectivity of the otherwise uncoated surface. (Uncoated surfaces where there is an abrupt change of index of refraction can have some reflectivity, typically 4%, but as high as 30% for some substrate materials.)

The attenuator adopted for use in the present invention need not necessarily be of the form illustrated in FIG. 1A or 1B, or as just described. Many varieties of multilayer dielectric coatings and their reflectivity characteristics, including the relationship between these characteristics and the angle of incidence of a beam, are known. Some such coatings when turned to the correct angle of incidence can reach a much lower transmittance than the minimum of about 81% shown in FIG. 2, namely down almost to zero. For many excimer laser systems a range from about 100% to about 80% transmittance is often appropriate. In a case where the output power is to be kept constant, the attenuator can be initially turned to its almost minimum transmittance. As the laser energy declines with time, the attenuator will be rotated to increase its transmittance and thus compensate for the loss of output energy. As a result, the total output of the system can be maintained constant, at least until the maximum transmittance of the attenuator has been reached, by which time the laser will likely be ready to be shut down and supplied with a fresh charge of gas or otherwise modified to restore its initial energy level.

It is desirable that the multilayer dielectric construction be of a type that provides a relatively smooth and gradual variation of transmittance with rotational angle. Some dielectric constructions exhibit sharp changes in this variation, and these would not be suitable for use in the present invention.

Figure 3:
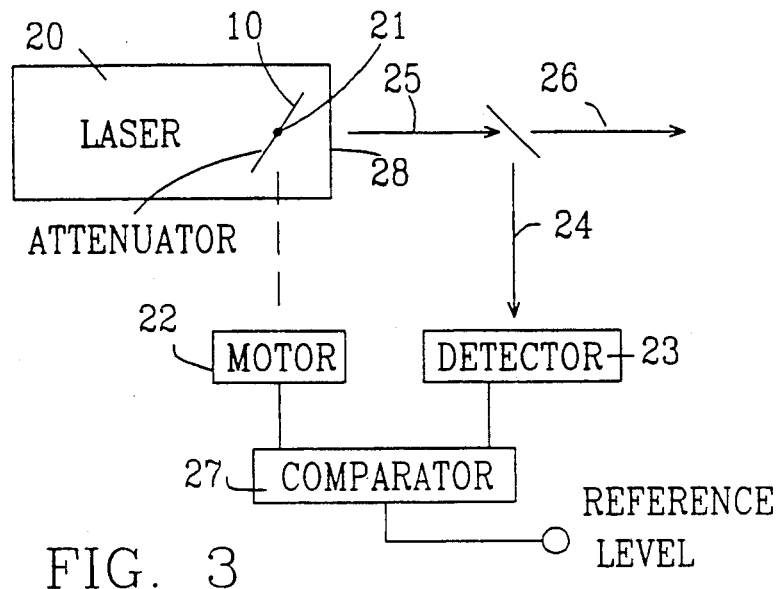
FIG. 3 is a diagram of a laser system employing this typical attenuator.

A system with a feedback loop is shown in FIG. 3 where a laser 20 has an attenuator 10 mounted internally within the optical resonator cavity of the laser and rotatable about an axis 21 by a stepping motor 22. A detector 23 measures the power of a portion 24 of the output beam 25, as provided by a beam splitter 26. This measured power is compared with a reference level in a comparator 27, the motor 22 being energized to restore any deviation from such level. The reference level can be a constant, if this is the desired nature of the output power, or it can be made to follow any desired predetermined program. An XeCl laser employing this system has been successfully operated to continuously provide a constant output of 0.5 Joule.

The output power of a laser is not its only characteristic that can be varied by use of an attenuator according to the present invention. In the case of a CW laser, the characteristic will be power, but in a pulsed laser it can either be power, peak power, or energy, i.e. pulse energy or total energy. Moreover, in most gas lasers including an excimer laser, the pulse length is dependent on the loss in the cavity (increased loss results in shortening of the pulse), so that control of an attenuator mounted inside the laser vessel can achieve a variation in pulse length. In all these cases, if automatic feedback control is part of the system, the detector 23 will be modified to measure the specific characteristic to be controlled, e.g. power, pulse energy, total energy, peak power or pulse length.

Instead of a feedback circuit, the angle of the attenuator 10 can be adjusted manually, such adjustment possibly being made on the basis of a read out from the detector.

Figure 6:
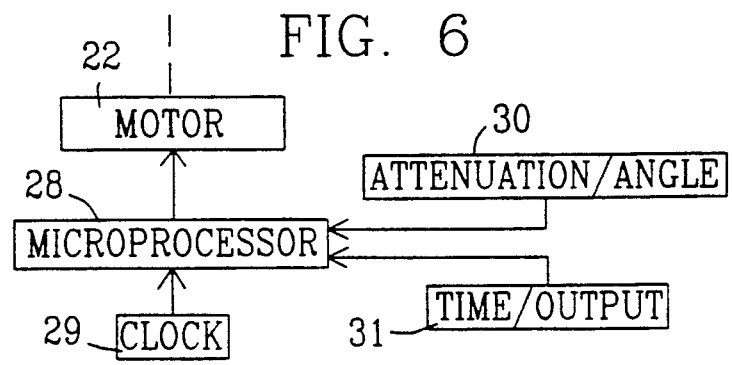

Alternatively, if the laser itself is known to have a constant output, or at least an output that is known as a function of time, and, if the relationship between the transmittance (attenuation) and the incident angle of the attenuator is known, the measurement of the final output by the detector 23 can be dispensed with, the motor 22 being stepped on the basis of elapsed time to the position necessary to deliver the angle required to achieve the desired level of output (power output or one of the other output characteristics discussed above). FIG. 6 shows such an arrangement with the motor 22 controlled by a microprocessor 28 that receives inputs from a clock 29 and from memories 30 and 31 that respectively store the relationship between the transmittance (attenuation) and the incident angle and the relationship between time and the output.

Figure 4:
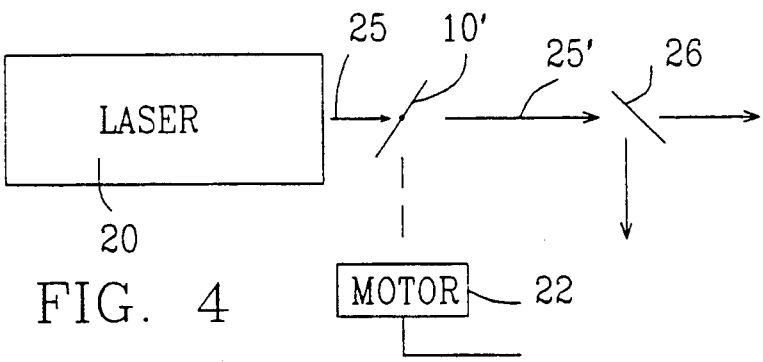
FIGS. 4, 5 and 6 are each a fragmentary view showing a modification of the system of FIG. 3.

While FIG. 3 shows the attenuator 10 inside the laser vessel, it is also possible to mount the attenuator externally of the laser, as shown in FIG. 4, which arrangement will retain the detector 23 and comparator 27 as in FIG. 3. In this case the attenuator 10' has been adopted. When the attenuator is mounted inside the optical resonator cavity of a pulsed, gas laser, as shown in FIG. 3, the attenuation effect of the attenuator is enhanced by the multiple number of round trips of the beam within the cavity. In other words, while rotation of the attenuator 10 through about 20° is shown in FIG. 2 as changing the transmittance by only about 2 to 3%, the actual attenuation effect on the output beam 25 may be more like 20%, because of the number of round trips that the beam will make inside the laser cavity (and hence through the attenuator) before it passes out of the optic 28. Hence a one-side-coated attenuator 10 provides a sufficient range of variation. On the other hand, when the attenuator is mounted externally a 20% change in transmittance is needed to achieve a 20% change in the power of beams 25 and 25' in FIG. 4.

Figure 5:
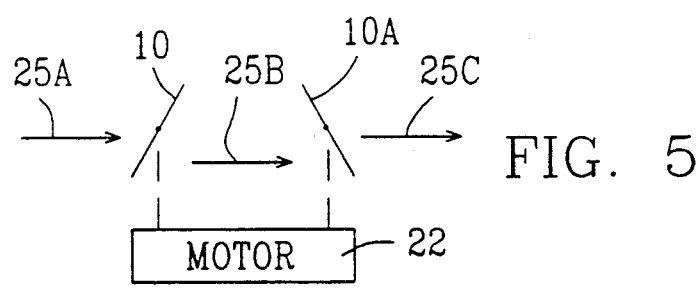

In the attenuators 10 and 10' shown in FIGS. 1A and 1B, the substrate 11 will be kept as thin as mechanically possible, e.g. 1 mm. However, there are some cases in which such a thin substrate will tend to crack. For example, in a $CO_2$ laser operating at 10.6 μm, the best transmitting substrates need to be much thicker than this, such as 5 mm. In this circumstance the attenuator will have a significant displacing effect on the beam due to refraction, and this displacement will vary with the rotational angle of the attenuator. If this effect presents problems in focusing the beam or directing it to the correct location, the displacement can be corrected as shown in FIG. 5 by providing a second device 10A beyond the attenuator 10 (or 10') and counter-rotating them simultaneously and symmetrically. On a somewhat exaggerated scale the arrows 25A, 25B and 25C illustrate the initial lateral displacement (25B) and its subsequent reversal (25C). The second device 10A can either be a plain (uncoated) substrate with essentially the same refractive characteristics as the attenuator 10 (or 10'), or can be a second attenuator coated in the same way as the attenuator 10 (or 10'), in which case it will also afford a cumulative attenuation effect. The second device 10A can be mounted with the first attenuator 10 (or 10') either inside the laser vessel (FIG. 3) or outside it (FIG. 4).

Apart from its use to correct for the refractive characteristics of the first attenuator, a second rotatable attenuator can be used simply to achieve a cumulative attenuation effect.

As indicated above, the invention is not limited to a laser system. The rotatable attenuator or attenuators can be used to vary the transmittance of non-coherent light that has been collimated, i.e. a beam.

While the applications of the invention to the various fields that have been disclosed, i.e. a non-coherent beam, a CW laser, a pulsed laser, a pulsed gas laser, such as a $CO_2$ laser, and an excimer laser, have in common exploitation of the variation of the transmittance characteristics of certain multilayer dielectric coatings when rotated, they are far from being equivalent to one another in overall performance and advantages. For example, in an excimer laser with a typical gain of from 10 to 30% per centimeter, or even in a $CO_2$ laser with a smaller but still relatively high gain, the performance is markedly different from that of a CW laser having a much lower gain, e.g. 0.01 to 0.1% per centimeter.

I claim:

1. Apparatus for varying the attenuation of a laser beam, comprising
   (a) a multilayer dielectric attenuator,
   (b) means for directing a laser beam onto a surface of said attenuator, a first portion of the beam being transmitted through the attenuator and a second portion being reflected by the attenuator,
   (c) means for rotating the attenuator about an axis extending substantially transverse to the beam to vary the angle of incidence of the beam on said surface and thereby vary the ratio between said portions, the attenuator being such that said ratio varies gradually with said angle, and
   (d) a feedback loop comprising
   (e) means for measuring an output characteristic of the laser,
   (f) means for comparing the measured characteristic with a reference value, and
   (g) means controlled by the comparing means for driving said rotating means to rotate the attenuator to adjust said output characteristic towards said reference value.

2. Apparatus according to claim 1, wherein the attenuator is mounted inside the optical resonator cavity of the laser whereby the attenuation effect of the attenuator is enhanced by the multiple number of round trips of the beam within said cavity.

3. Apparatus according to claim 1, wherein the attenuator is mounted outside the optical resonator cavity of the laser whereby its attenuation effect is independent of the number of round trips of the beam within the laser cavity.

4. Apparatus according to claim 1, wherein said reference value is constant.

5. Apparatus according to claim 1, wherein said reference value comprises a predetermined program of values.

6. Apparatus according to claim 1, wherein said output characteristic is power, pulse energy, pulse power, peak power, or pulse length.

7. Apparatus according to claim 1, wherein said laser is a CW laser.

8. Apparatus according to claim 1, wherein said laser is a pulsed laser.

9. Apparatus according to claim 8, wherein said pulsed laser is a $CO_2$ laser.

10. Apparatus according to claim 8, wherein said pulsed laser is an excimer laser.

11. Apparatus according to claim 1, including a second multilayer dielectric attenuator mounted to receive an output beam from the first attenuator and to transmit a portion of said output beam, and means for rotating the second attenuator about an axis extending substantially transverse to said output beam.

12. Apparatus according to claim 1, including a device mounted to receive an output beam from the attenuator and to transmit the same, said device having similar refractive characteristics to those of the attenuator, and means for counter-rotating said device and the attenuator whereby to compensate for lateral displacement of the beam by the attenuator.

13. Apparatus according to claim 12, wherein said device is a second attenuator.

14. Apparatus according to claim 1, wherein said attenuator comprises a substrate with dielectric layers on at least one side thereof.

15. Apparatus according to claim 14, wherein the dielectric layers are alternately arranged layers of scandium oxide and silicon dioxide.

16. Apparatus according to claim 1, wherein said attenuator comprises a substrate with dielectric layers on both sides thereof.

17. Apparatus according to claim 1, wherein said attenuator comprises a substrate with dielectric layers on one side thereof and an antireflective coating on the other side thereof.

18. Apparatus according to claim 1, including means storing the relationship between said angle and said ratio, means storing the relationship between an output characteristic of the laser and time, clock means, and microprocessor means connected to said clock means and to said storing means for controlling the means for rotating the attenuator to cause the output characteristic of the laser to follow a predetermined program of values.

19. Apparatus according to claim 18, wherein said output characteristic is power, pulse energy, pulse power, peak power or pulse length.

20. A laser comprising
 (a) an optical resonator cavity,
 (b) a multilayer dielectric attenuator mounted in said cavity to receive a laser beam on a surface of said attenuator, a first portion of the beam being transmitted through the attenuator and a second portion being reflected by the attenuator, and
 (c) means for rotating the attenuator about an axis extending substantially transverse to the beam to vary the angle of incidence of the beam on said surface and thereby vary the ratio between said portions, the attenuator being such that said ratio varies gradually with said angle.

21. A laser comprising
 (a) an optical resonator cavity,
 (b) a multilayer dielectric attenuator mounted in said cavity to receive a laser beam on a surface of said attenuator, a first portion of the beam being transmitted through the attenuator and a second portion being reflected by the attenuator, the attenuation effect of the attenuator being enhanced by the multiple number of round trips of the beam within the cavity, and
 (c) means for rotating the attenuator about an axis extending substantially transverse to the beam to vary the angle of incidence of the beam on said surface and thereby vary the ratio between said portions and hence vary an output characteristic that is dependent upon loss in the cavity, the attenuator being such that said ratio varies gradually with said angle.

22. The laser of claim 21, wherein said output characteristic is pulse length.

23. The combination of a laser according to claim 21, and
 (d) means for measuring a said output characteristic of the laser,
 (e) means for comparing the measured characteristic with a reference value, and
 (f) means controlled by the comparing means for driving said rotating means to rotate the attenuator to adjust said output characteristic towards said reference value.

* * * * *